No. 650,692. Patented May 29, 1900.
A. SCHÄRFL.
PUNCHING MACHINE.
(Application filed Feb. 21, 1900.)
(No Model.) 3 Sheets—Sheet 1.

Witnesses:
Anton A. Gloetzner
N. Mitchell

Inventor:
Andreas Schärfl
by Max J. Ingall
Attorney

THE NORRIS PETERS CO., PHOTO-LITHO., WASHINGTON, D. C.

No. 650,692. Patented May 29, 1900.
A. SCHÄRFL.
PUNCHING MACHINE.
(Application filed Feb. 21, 1900.)
(No Model.) 3 Sheets—Sheet 2.
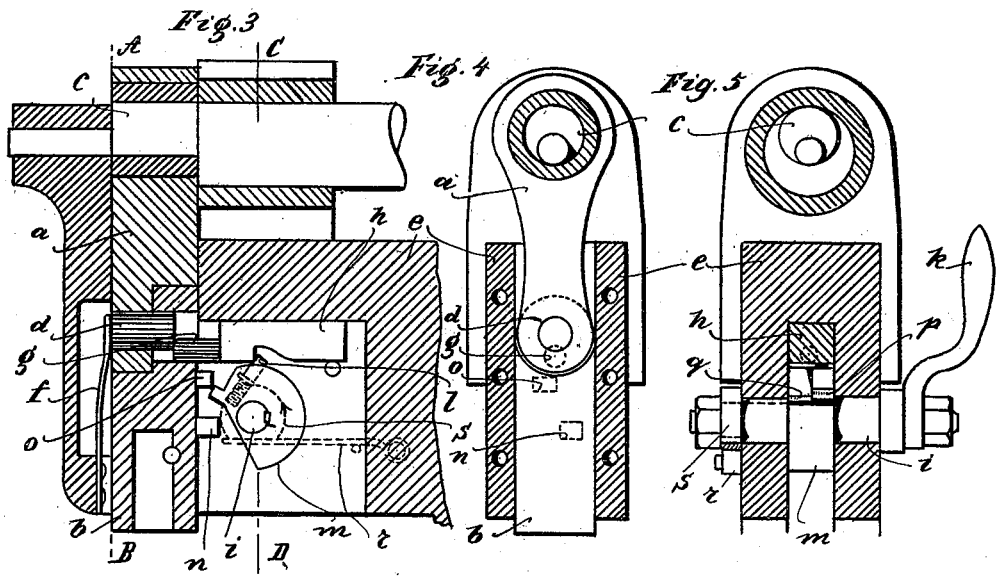
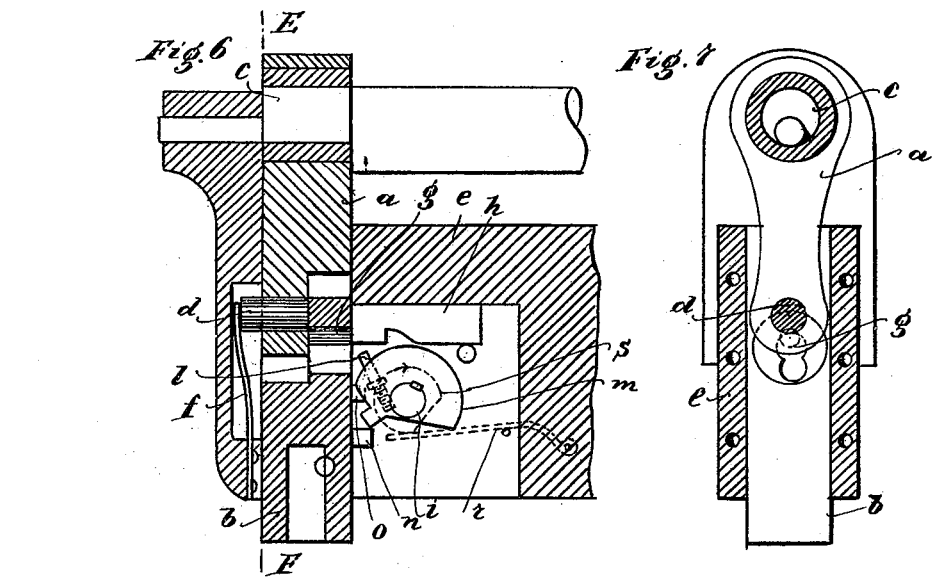
Witnesses:
Anton A. Gloetzner
N. Mitchell
Inventor:
Andreas Schärfl
by Max Engel
Attorney

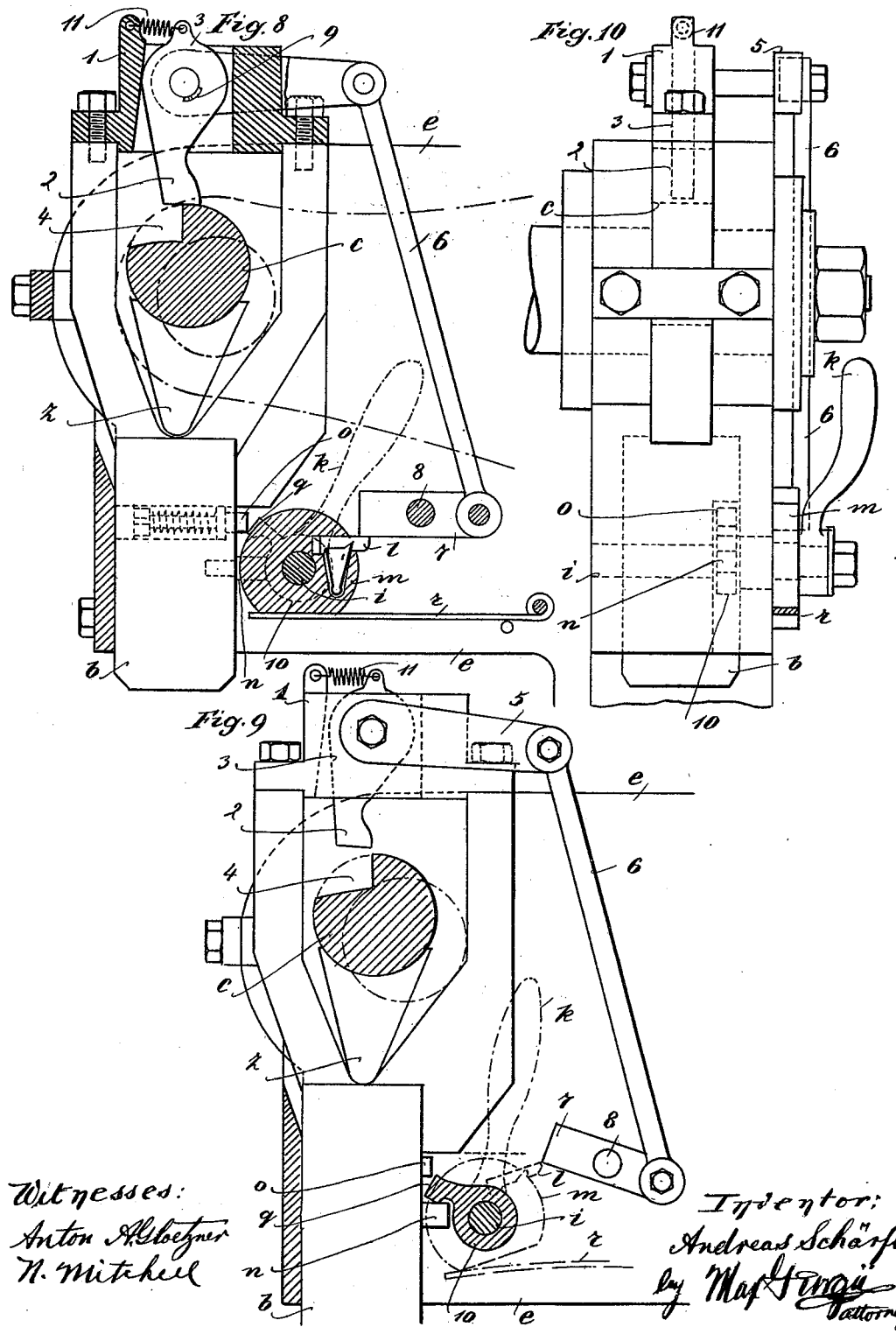

UNITED STATES PATENT OFFICE.

ANDREAS SCHÄRFL, OF MUNICH, GERMANY.

PUNCHING-MACHINE.

SPECIFICATION forming part of Letters Patent No. 650,692, dated May 29, 1900.

Application filed February 21, 1900. Serial No. 6,027. (No model.)

*To all whom it may concern:*

Be it known that I, ANDREAS SCHÄRFL, a citizen of Germany, residing at Munich, Bavaria, Germany, have invented certain new and useful Improvements in Punches; and I do hereby declare the following to be a full, clear, and exact description of the invention, such as will enable others skilled in the art to which it appertains to make and use the same.

This invention relates to punching-machines in which the punch-holder can be connected and disconnected from the eccentric-bar by certain novel means and also the punch-holder can be raised and lowered by the same means.

Figure 1:
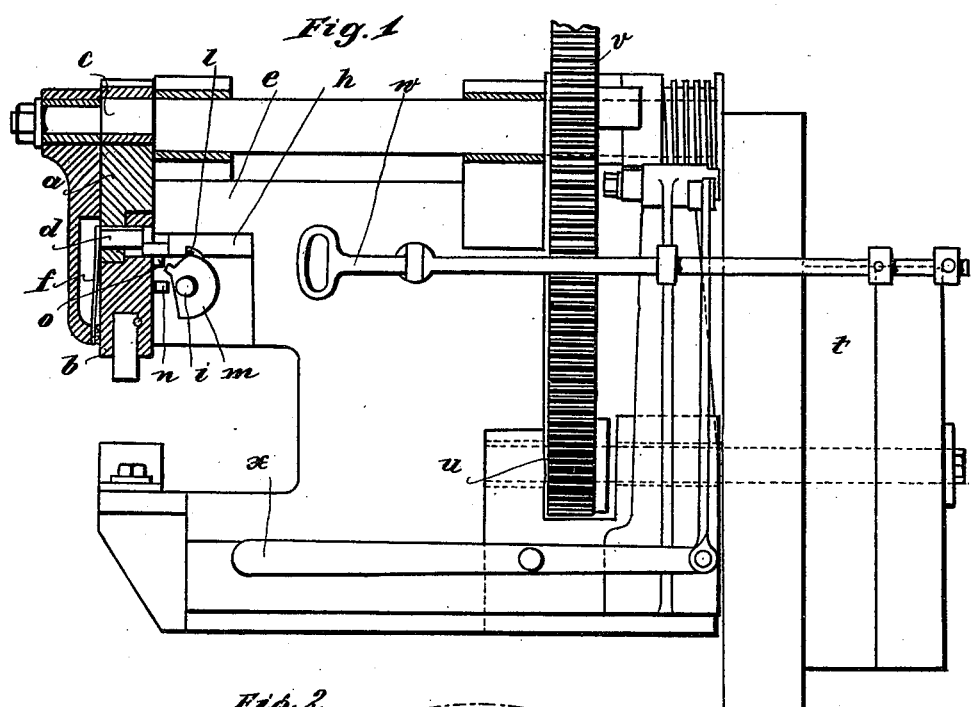
Figure 2:
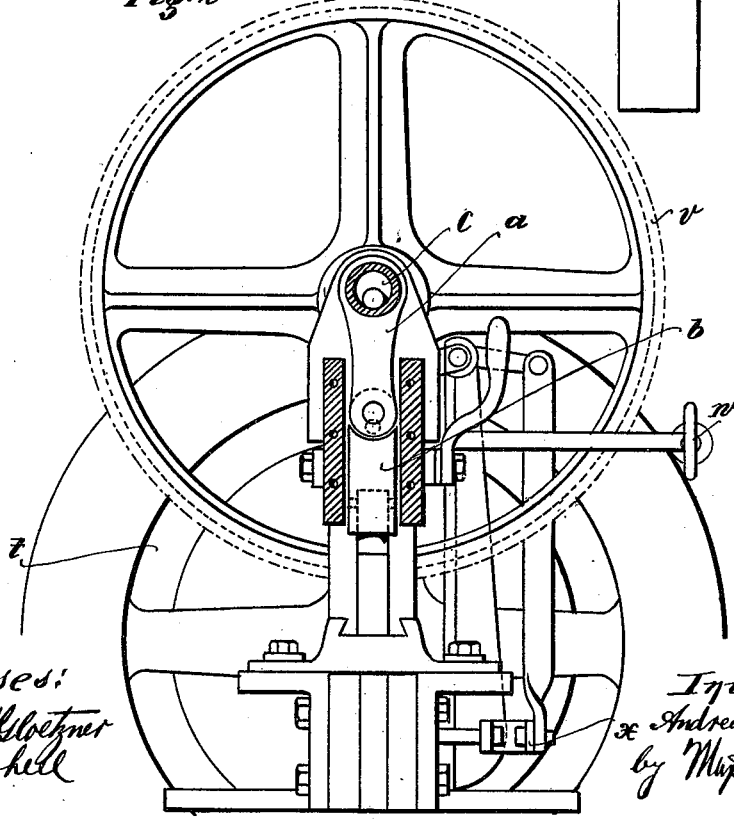

In the accompanying drawings, Figure 1 is a side elevation of a punch embodying my invention in its preferred form. Fig. 2 is a front view of the same; Fig. 3, a sectional view showing the punch-holder and eccentric-bar coupled. Fig. 4 is a section on the line A B of Fig. 3; Fig. 5, a section on the line C D, Fig. 3; Fig. 6, a view similar to Fig. 3, but showing the punch-holder and eccentric-bar disconnected; Fig. 7, a section on the line E F, Fig. 6. Figs. 8, 9, and 10 show a modification.

Referring to the drawings, $a$ is the eccentric-bar engaging an eccentric $c$ by its upper end and having its lower end sliding in a guideway in the frame, as shown in Figs. 2, 4, and 7. In this guideway also slides the punch-holder $b$. The adjacent ends of the eccentric-bar and punch-holder are each reduced or otherwise so disposed that two of their longitudinal faces are in contact for a short distance in certain positions of these members, as shown in Fig. 3.
The extremity of the bar $a$ has a transverse aperture in which slides a pin $d$, and the upper end of the punch-holder $b$ has a similar aperture that, when the bar and rod are together, as shown in Fig. 3, registers with the aperture in the bar $a$, in which position the pin $d$ is caused to enter into the punch-holder by a spring $f$ bearing on its outer extremity, thus locking the eccentric-rod and the punch-holder together.
The eccentric $c$ is mounted on a horizontal shaft that is rotated by any preferred means.

To disconnect the punch-holder from the eccentric-bar, I provide a pin $g$, secured to a suitable slide $h$, reciprocating in the frame $e$. This pin $g$ is smaller than the aperture in the punch-holder, so that it will not interfere with the movement of the latter.

In the frame $e$ is mounted a short shaft $i$, having an operating-handle $k$ on one extremity. On this shaft is also secured a disk $m$, having projections $p$ and $q$, shaped, preferably, as shown in Fig. 5, and also a spring-pin $l$, which latter can engage a notch in the slide $h$.

The punch-holder has a lug $o$, disposed in the path of movement of the projection $q$, and also a lug $n$, arranged to be brought into contact with the projection $p$. The lug $o$ slides in an aperture in the punch-holder and is normally retained in the position shown by a spiral spring. The shaft $i$ has also a disk $s$, that has a flattened portion on its periphery, on which bears a spring $r$, which latter tends to retain the disk in the position shown in Fig. 3.

With the parts in the position shown in Fig. 3 the punch-holder and the eccentric-bar are coupled together. When it is desired to disconnect them, the disk $m$ is rotated in the direction of the arrow, Fig. 3, by the handle $k$, by which movement the pin $l$, engaging the notch of the slide $h$, moves it and the pin $g$ forward, which latter will impinge on the pin $d$ and force it out of the aperture in the punch-holder, thus disconnecting the bar and the punch-holder. On a further movement of the disk $m$ the projection $p$ will engage the lug $n$, and the eccentric-rod being now disengaged from the punch-holder the latter will be lowered to the position shown in Fig. 6. During the movement of the disk $m$ the projection $q$ will impinge on the lug $o$, which will slide inwardly and allow this projection to pass it, being returned at once to its normal position by the spiral spring; but when the disk $m$ is turned in the opposite direction, as indicated in Fig. 6, the projection $q$ will engage the pin $o$, and consequently will raise the punch-holder $b$ until the apertures in it and the bar $a$ again register, when the pin $d$ will be caused by its spring $f$ to again connect these two members. The spring-pin $l$ during this latter movement of the disk $m$ will impinge on the slide $h$ and be pressed inwardly until it arrives at the notch in said slide, when its spiral spring will force it into the said notch.

In the above-described arrangement the eccentric-shaft is parallel to the frame $e$. Figs. 8 and 9 show another arrangement of the machine, in which the eccentric-shaft is arranged in a transverse direction to the frame.

The punch-holder $b$, being vertically guided in the body $a$, is in its upper forked part curved in such a manner over the eccentric $c$ that the latter can move quite freely. The two parts of the fork are connected by a cross-head 1, thus forming a kind of frame surrounding the eccentric. The working of the punch-holder $b$ by the eccentric $c$ is performed in such a manner that the eccentric when going downward presses on the tongue $z$, and while in going upward the punch-holder is lifted by the arm 2 of the disk 3.

The tongue $z$ and disk 3 supplant the guide necessary for the eccentric and allow at the same time, by means of the coupling mechanism, that the punch-holder $b$ can be made independent of the movement of the eccentric. This is obtained in the following way: The disk 3, with its arm 2, can by means of levers be turned from the position it occupies in Fig. 8 to the position shown in Fig. 9, whereby the arm 2 is placed directly over a recess 4 of the eccentric $c$. Since by the arrangement of recess 4 in the eccentric the arm 2 can pass freely, the piece $b$ can also go down so far till the arm 2 meets again on recess 4. This is quite sufficient for connecting the punch on the work-piece. The lever system, consisting of the lever 5, firmly connected with the shaft of the disk 3 of the connecting-rod 6, and the double lever 7, is worked by the elastic bolt $l$ of disk $m$, which can be turned by means of the handle $k$. Fig. 9 shows the position in which the bolt $l$ has turned the double lever 7 so far that the arm 2 of disk 3 leaves its support on the eccentric $c$. If the rotation of the disk $m$ is continued, the lever system 5 6 7 returns to its original position, however the arm 2 lags behind, because the punch-holder $b$, and with it the disk 3, has gone down so far that the arm 2 rests on the recess 4 of the eccentric. In order to make the disk 3 independent of its shaft, the former has a segmental recess arranged in this manner that a lug fixed to the shaft catches the disk in turning the shaft in one direction, but is disengaged on turning the same in the opposite direction. After the eccentric $c$ has gone down the disk 3 is placed by the spiral spring 11 in the original position. This mechanism would be sufficient for disengaging the punch-holder $b$ and for making its movement independent of the driving device; but the working of the punching-machine requires that the punch-holder can be lifted and lowered by the lever $k$ at the same time. This is accomplished by the following contrivance:

On a shaft $i$, which can be turned by the lever $k$, are fixed two disks $m$ and 10. The disk $m$ is arranged on the outside of the frame $e$, while the disk 10, provided with a peg $q$, is within the frame. By turning the lever $k$ to the left the peg $q$ engages the tappets $o$ and $n$, fixed to the punch-holder $b$, whereby the latter are moved up and down. If the lever and the disk 10 are afterward turned back, the peg $q$ engages the tappet $o$ and lifts the punch-holder. The bolt $l$ of the disk $m$ comes by this revolution in contact with the double lever 7 and is pressed back till the lever 7 is passed. Therefore by simply turning the lever $k$ the lever system is uncoupled and the punch-holder can at the same time be lifted and lowered by means of the disk 10 on the tappet $q$.

The above description, as well as the drawings, refers especially to a punching-machine driven by a toothed segment, and the eccentric-shaft executes no full revolution; but it is easy to furnish this kind of punching-machines also with continuous revolving shafts, and in this case the recess 4 of the eccentric is superfluous. The arm 2 must therefore be bent back so far that it can give way to the eccentric.

Having now particularly described and ascertained my invention, I claim the following:

1. The combination in a machine of the character described, of a punch-holder having a transverse aperture in its upper end, an actuating-bar having a transverse aperture in its lower end, said members adapted to be brought together with said apertures registering, a pin adapted to slide in said apertures when registering and couple said members, a spring for retaining the pin in position to couple said members, and means disconnected therefrom for moving said pin out of the aperture in one member, substantially as set forth.

2. The combination in a machine of the character described, of a punch-holder having a transverse aperture in its upper end, an actuating-bar having a transverse aperture in its lower end, said members adapted to be brought together with said apertures registering, a pin sliding in the aperture in said actuating-bar and adapted to enter the aperture in the said punch-holder to couple said members, a spring bearing on the end of said pin for retaining it in position to couple said members, and means disconnected therefrom for moving the said pin out of the aperture in the punch-holder, substantially as set forth.

3. The combination in a machine of the character described, of a puch-holder having a transverse aperture in its upper end, an actuating-bar having a transverse aperture in its lower end, said members adapted to be brought together with said apertures registering, a pin adapted to slide in said registering apertures and couple said members, a spring secured to the frame of the machine and bearing on the extremity of said pin, and means disconnected therefrom for moving said pin out of the aperture in one of said members, substantially as set forth.

4. The combination in a machine of the character described, of a punch-holder having a transverse aperture in its upper end, an actuating-bar having a transverse aperture in its lower end, said members adapted to be brought together with said apertures registering, a pin sliding in the said aperture in the actuating-bar and adapted to enter the said aperture in the punch-holder to couple the members, a spring bearing on the end of said pin for retaining it in position to couple said members, a slide mounted in a guideway in the frame and adapted to be reciprocated in a direction transverse to the punch-holder, a projection on said slide adapted to enter said aperture in the punch-holder and force the said pin out of said aperture, and means for actuating said slide, substantially as set forth.

5. The combination in a machine of the character described, of a punch-holder having a transverse aperture in its upper end, an actuating-bar having a transverse aperture in its lower end, said members adapted to be brought together with said apertures registering, a pin sliding in the said aperture in the actuating-bar and adapted to enter the said aperture in the punch-holder to couple the members, a spring bearing on the end of said pin for retaining it in position to couple said members, a slide mounted in a guideway in the frame and adapted to be reciprocated in a direction transverse to the punch-holder, a projection on said slide adapted to enter said aperture in the punch-holder and force the said pin out of said aperture, means for actuating said slide, said slide having a notch in one side, a shaft mounted in the frame of the machine, a disk secured to said shaft and having a spring projection adapted to engage the wall of said notch on the rotation of said disk to operate said slide, and an actuating-handle mounted on said shaft, substantially as set forth.

6. The combination in a machine of the character described, of a punch-holder having a transverse aperture in its upper end, an actuating-bar having a transverse aperture in its lower end, said members adapted to be brought together with said apertures registering, a pin sliding in the aperture in said actuating-bar and adapted to enter the aperture in the said punch-holder to couple said members, a spring bearing on the end of said pin for retaining it in position to couple said members, and means for moving the said pin out of the aperture in the punch-holder and then forcing the punch-holder downwardly, substantially as set forth.

7. The combination in a machine of the character described, of a punch-holder having a transverse aperture in its upper end, an actuating-bar having a transverse aperture in its lower end, said members adapted to be brought together with said apertures registering, a pin sliding in the aperture in said actuating-bar and adapted to enter the aperture in the said punch-holder to couple said members, a spring bearing on the end of said pin for retaining it in position to couple said members, and means adapted to move the said pin out of the aperture in the punch-holder and then force the punch-holder downwardly, said means also adapted upon a reverse movement to raise the punch-holder to the position for coupling, substantially as set forth.

8. The combination in a machine of the character described, with a punch-holder and an actuating-bar, of means for coupling said members, and means for uncoupling said members and then forcing the punch-holder downwardly, substantially as set forth.

9. The combination in a machine of the character described, with a punch-holder and an actuating-bar, of means for coupling said members, and means for uncoupling said members and then forcing said punch-holder downwardly, said latter means also adapted upon a reverse movement to raise the punch-holder to the position for coupling with the actuating-bar, substantially as set forth.

10. The combination in a machine of the character described, of a punch-holder having a transverse aperture in its upper end, an actuating-bar having a transverse aperture in its lower end, said members adapted to be brought together with said apertures registering, a pin sliding in the aperture in the actuating-bar and adapted to enter the aperture in the punch-holder to couple the members, a spring bearing on the end of the said pin for retaining it in position to couple said members, a slide mounted in a guideway in the frame, and adapted to be reciprocated in a direction transverse to the punch-holder and force the said pin out of the aperture in the punch-holder, means for actuating said slide, said slide having a transverse notch in one side, a shaft mounted in the frame of the machine, a disk secured to said shaft and having a spring projection adapted to engage the wall of said notch and move said slide on the rotation of the disk, an actuating-handle mounted on said shaft, a lug projecting from said disk, a lug projecting from the punch-holder and arranged in the path of movement of said lug on the disk, said lugs adapted to contact to force the punch-holder downwardly on the further rotation of the disk after the disk has actuated said slide to uncouple the said members, substantially as set forth.

11. The combination in a machine of the character described, of a punch-holder having a transverse aperture in its upper end, an actuating-bar having a transverse aperture in its lower end, said members adapted to be brought together with said apertures registering, a pin sliding in the aperture in the actuating-bar and adapted to enter the aperture in the punch-holder to couple the members, a spring bearing on the end of the said pin for retaining it in position to couple said members, a slide mounted in a guideway in the frame and adapted to be reciprocated in a direction transverse to the punch-holder and force the said pin out of said aperture, means for actuating said slide, said slide having a notch in one side, a shaft mounted in the frame of the machine, a disk secured to said shaft and having a spring projection adapted to engage the wall of said notch and move said slide on the rotation of said disk, an actuating-handle mounted on said shaft, a lug projecting from said disk, a lug projecting from the punch-holder and arranged in the path of movement of said lug on the disk, said lugs adapted to contact to force the punch-holder downwardly on the further rotation of the disk after the disk has actuated said slide to uncouple the said members, another lug projecting from said disk, a spring-pin on the punch-holder disposed in the path of movement of said latter lug and adapted to retreat to allow the lug to pass downwardly without moving the punch-holder, but to raise the punch-holder on the reverse movement of the disk, substantially as set forth.

12. The combination in a machine of the character described, with a punch-holder, and an actuating-bar, of means for automatically coupling said members when together, and means for uncoupling said members and then forcing the punch-holder downwardly, substantially as set forth.

13. The combination in a machine of the character described, with a punch-holder, and an actuating-bar, of means for automatically coupling said members when together, and means for uncoupling said members and then forcing said punch-holder downwardly, said latter means also adapted upon a reverse movement to restore the punch-holder to the position for coupling with the actuating-bar, substantially as set forth.

14. The combination in a machine of the character described, with a punch-holder and an actuating-bar, of means for automatically coupling said members when together, a slide arranged to uncouple said members, means arranged to first actuate said slide to uncouple said members and then to force the punch-holder downwardly, said latter means also adapted upon a reverse movement to restore the punch-holder to the position for coupling with the actuating-bar, substantially as set forth.

15. The combination in a machine of the character described, of a punch-holder, bars extending upwardly therefrom, a yoke connecting said bars, an arm pivoted to said yoke and extending downwardly between said bars, an eccentric extending between said bars and engaging the extremity of said arm, said eccentric having a notch in its periphery, a block lying between the eccentric and the punch-holder, a disk pivoted to the framework of the machine, a spring-pin mounted on said disk, a lever pivoted to the frame of the machine and engaging said spring-pin, an arm secured to said arm mounted on the yoke, a rod connecting said latter arm with said lever, a disk secured to said disk, a lug on said latter disk, a spring-pin on the punch-holder arranged to engage the said lug on the disk and raise the punch-holder, and another pin on the punch-holder also arranged to engage said lug to force the punch-holder downwardly, substantially as set forth.

In testimony whereof I affix my signature in presence of two witnesses.

ANDREAS SCHÄRFL.

Witnesses:
 MARY PALNBERGER,
 GUSTAVUS SORG.